United States Patent
Chen et al.

(10) Patent No.: US 7,098,300 B1
(45) Date of Patent: Aug. 29, 2006

(54) APPARATUS AND PROCESS FOR CONTINUOUS SOLID-STATE POLY-CONDENSATION IN A FLUIDIZED REACTOR WITH MULTIPLE STAGES

(75) Inventors: Chi-Chin Chen, Vernon Hills, IL (US); Leon Yuan, Lake Forest, IL (US)

(73) Assignee: UOP LLC, Des Plaines, IL (US)

( * ) Notice: Subject to any disclaimer, the term of this patent is extended or adjusted under 35 U.S.C. 154(b) by 311 days.

(21) Appl. No.: 10/325,233

(22) Filed: Dec. 19, 2002

(51) Int. Cl.
*C08F 6/00* (2006.01)

(52) U.S. Cl. .......... 528/492; 528/491; 528/503; 526/65; 425/6; 425/10

(58) Field of Classification Search .......... 528/491, 528/492, 503; 526/65; 425/6, 10
See application file for complete search history.

(56) References Cited

U.S. PATENT DOCUMENTS

| | | | |
|---|---|---|---|
| 4,165,420 A | 8/1979 | Rinehart | 526/63 |
| 4,205,157 A | 5/1980 | Duh | 528/272 |
| 5,408,035 A | 4/1995 | Duh | 528/480 |

FOREIGN PATENT DOCUMENTS

JP 49-18117 6/1969

OTHER PUBLICATIONS

Article "Reaction Kinetics for Solid–State Polymerization of Poly(ethylene terephthalate)" by B. Duh, *Journal of Applied Polymer Science*, vol. 81, 1748–1761 (2001).

*Primary Examiner*—Samuel A. Acquah
(74) *Attorney, Agent, or Firm*—John G. Tolomei; James C. Paschall

(57) ABSTRACT

Disclosed is a multistage fluidized SSP reactor that tightens the distribution of residence time and the resulting average intrinsic viscosity of the polymer product. Less residence time is needed to achieve a desired average intrinsic viscosity. As the polymer beads continuously flow through sequential stages, poly-condensation reactions continue to develop almost under plug-flow conditions. Five fluidized stages or more provide advantageous performance.

20 Claims, 1 Drawing Sheet

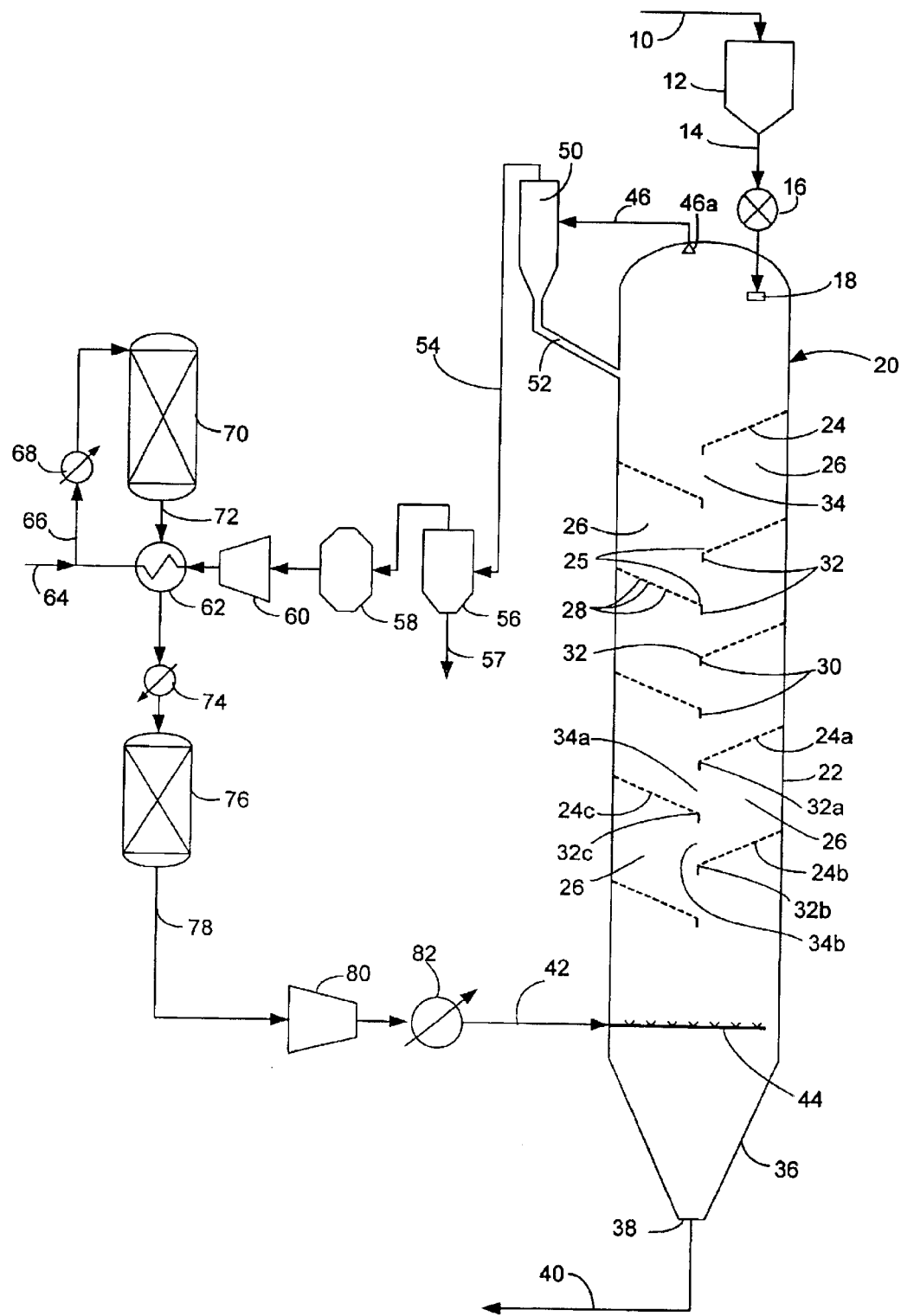

US 7,098,300 B1

APPARATUS AND PROCESS FOR CONTINUOUS SOLID-STATE POLY-CONDENSATION IN A FLUIDIZED REACTOR WITH MULTIPLE STAGES

FIELD OF THE INVENTION

The present invention relates to an apparatus and process for continuous solid-state poly-condensation (SSP) of polyester resin particles. Specifically, the present invention relates to SSP of polyester resin particles in a multistage, fluidized reactor.

BACKGROUND OF THE INVENTION

Polyesters are condensation polymers that are important in the polymer industry. Common polyester resins include poly(ethylene terephthalate), PET, poly(trimethylene terephthalate), PTT, and poly(butylene terephthalate), PBT. Commercial processes for manufacturing polyesters typically include four steps: esterification, precondensation, finishing, and solid-state polycondensation (SSP). The conventional melt-phase polymerization (MPP) process for manufacturing PET chips comprises the first three of these steps.

The esterification step can be performed in two principal ways. Direct esterification of purified terephthalic acid (PTA) with ethylene glycol (EG) and trans-esterification of dimethyl terephthalate (DMi) with EG or similar diols. Other commercially important glycols include 1,3-propanediol, 1,4-butanediol and 1,4-dimethylolcyclohexane. Direct esterification is considerably more rapid than trans-esterification. The direct esterification process also eliminates the need to recover or recycle methanol that is generated as a by-product U.S. Pat. No. 4,205,157 discloses that long exposure to high temperatures in MPP causes thermal degradation which can form carboxyl and vinyl end groups. Vinyl end groups can deteriorate into acetaldehyde in the final polyester product. Less than one ppm of acetaldehyde is specified for PET bottle resins. Co-monomers such as purified isophthalic acid (PIA) and diethylene glycol (DEG) must be co-polymerized with PET to meet the bottle grade specification. The co-monomers reduce the temperature of melting the solid PET chips again inside the barrel of an injection molding machine and decrease the crystallization rate during the injectior/cooling cycle of the molten PET to give the injection-molded pre-forms. A homo-polymer of PTA and EG shows a peak melting temperature of about 259° C. by differential scanning calorimetry (DSC), while a co-polymer of bottle resins has a peak melting temperature of about 248° C. Lower temperatures to melt the solid PET chips minimize the generation of acetaldehyde and improve the color of bottle pre-forms. A slow crystallization rate is favorable to produce the transparent pre-forms without haze.

The polyester oligomers from the esterification step are subjected to a second step, pre-condensation, in an intermediate reactor to upgrade the intrinsic viscosity. The finishing step in MPP continues to upgrade the molten PET to higher molecular weights appropriate for fiber grades and bottle pre-polymers. During the finishing step, the highly viscous molten PET is continuously stirred with a specially-designed agitator to increase its surface area for effective removal of EG or other by-products by using a very low vacuum or forcing an inert gas through the reaction mixture.

The molten PET from MPP is cooled and then formed into pellets or pastilles as pre-polymers. Clear pellets are made from extruded strands that are rapidly quenched and chopped up to have a maximum dimension of about 2.5 to 3.0 mm. Amorphous PET pellets from MPP typically have an intrinsic viscosity of 0.57 to 0.65 dl/g which is adequate for textile or carpet applications. Opaque pastilles are generated in a modified MPP process without the finishing step, which reduces the MPP reaction time from 3 to 7 hours down to about 2 hours. Partially crystalline pastilles as pre-polymers have, however, a relatively low intrinsic viscosity of 0.18 to 0.25 dl/g which is not sufficient for textile or carpet grades. Pastilles with a relatively low molecular weight are drop formed to have a maximum dimension of about 2.5 to 3.0 mm. Commercial beverage bottles requires the processing by injection molding and stretched blow molding of PET chips with intrinsic viscosity of about 0.72 to 0.85 dl/g. Hence, prepolymers from MPP must be fed to the subsequent SSP to increase the molecular weight of pellets for bottle uses or raise the intrinsic viscosity of pastilles for bottle, textile, or carpet grades.

SSP is a thermal treatment process to upgrade PET to a desired molecular weight that is proportional to intrinsic viscosity. SSP is typically performed in a gravity-driven moving bed reactor. The prepolymers fed to the SSP unit can be completely amorphous pellets or partially crystallized pastilles. However, amorphous PET pellets are only thermally stable and therefore not sticky up to the glass transition temperature of about 80° C. The SSP reaction temperature is, however, above 200° C. Consequently, it is a pre-requisite to partially crystallize the PET pellets after MPP and prior to continuous SSP in a gravity flow reactor. The potential for stickiness of partially crystallized PET pellets shifts from the glass transition temperature toward the onset of melting temperature of about 235° C. Hence, precrystallizer and crystallizer vessels are typically utilized between the MPP and the conventional SSP reactor. The elevation of the entire complex is usually very high because the precrystallizer is stacked above the crystallizer, and the crystallizer is stacked above the SSP reactor.

In a gravity-driven SSP moving bed with extruded pellets, the maximum reaction temperature is constrained by temperature at which the PET chips tend to stick. The normal operating SSP temperature for a copolymer is approximately 210° C., but the normal operating temperature of a homo-polymer can be as high as 220° C. The SSP reaction time can be as high as 12 to 18 hours to bring amorphous pellets of 2.5 to 3.0 mm in diameter and length and over 24 hours to advance semi-crystalline pastilles of 2.5 to 3.0 mm in diameter to the target intrinsic viscosity of 0.72 to 0.85 dl/g.

In an SSP reaction, either ester interchange shown in Formula 1 or esterification shown in Formula 2 occurs:

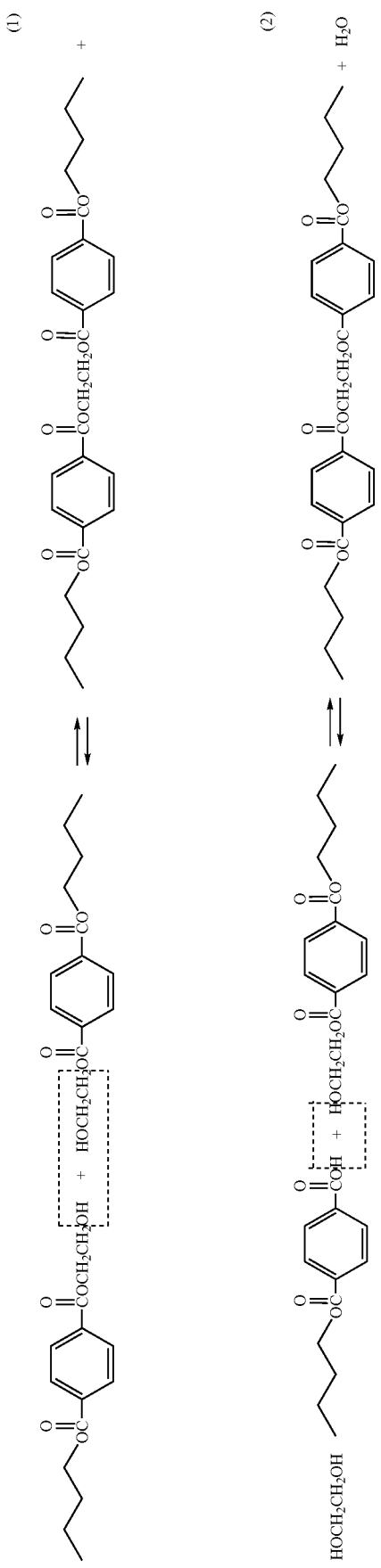

Typically, an inert gas stream, typically nitrogen, is purged through the SSP reactor to heat the PET particles and purge the by-products such as water and ethylene glycol from the SSP reactions. Purge of by-products decreases the occurrence of the reverse reaction and drives the equilibrium toward the poly-condensation. The purge gas stream is purified and recirculated to the SSP reactor. The SSP also provides a polymer with low acetaldehyde content. The acetaldehyde by-products are vaporized, diffuse out of the polymer when heated, and purged away by the inert gas stream during SSP. If the preceding MPP is conducted at relatively low temperatures, as explained in U.S. Pat. No. 4,205,157, it is expected to observe a smaller concentration of vinyl end groups and carboxyl end groups. The ester interchange reaction rate of Formula 1 is faster than the esterification reaction rate of Formula 2. B. Duh, *Reaction Kinetics for Solid-State Polymerization of Poly(ethylene terephthalate)*, J. Appl. Poly. Science, Vol. 81, 1748 (2001) studied SSP of PET prepolymers in a batch fluidization bed and suggested a kinetic model with respect to the active end group concentration. The SSP reaction can be considered as a second-order reaction. The publication explains that if the particle sizes are small enough and the purge gas flow rate is high enough, the kinetics of poly-condensation will tend to be reaction-controlled.

U.S. Pat. No. 4,165,420 discloses a rotary spraying congealer to convert the molten PET into beads having an average particle size of 100 to 250 μm. The beads are sufficiently crystallized during cooling after atomization to obviate a crystallizing step prior to SSP. The beads are then polycondensed in a fluidized bed. U.S. Pat. No. 4,205,157 discloses solid-state polycondensation of precrystallized prepolymers in a fluidized bed. U.S. Pat. No. 5,408,035 discloses an SSP unit comprising two unfluidized moving bed reactors in series preceded by a crystallizer and a preheater.

JP 49-18117 B discloses an SSP reactor comprising multiple discrete fluidized chambers. The PET pellets used had a maximum dimension of 4 mm and an initial intrinsic viscosity of 0.70 dl/g. In one embodiment, a partition separates the discrete chambers until opened to allow the contents to enter the succeeding chamber. In this embodiment, it took 6 hours of residence time to improve the intrinsic viscosity from 0.7 to about 0.98 dl/g. In a second embodiment, partitions separate the discrete chambers that are fluidly communicated by an overflow tube with an opening spaced above the floor of the chamber. Hence, fluidized PET pellets had to randomly spill over the top of the overflow tube to proceed to the subsequent reaction chamber. A total mean residence time of five hours was necessary to upgrade the intrinsic viscosity of the pellets in the reactor from 0.70 to above 0.90 dl/g. However, the distribution of intrinsic viscosity was broad, indicating the undesirable residence time distribution of the pellets that occurs in a reactor where chambers are communicated by an overflow tube.

A single fluidized bed has several advantages for continuous SSP of small PET beads. Fluidizing the beads reduces their sticking tendency because the agitated particles are not in contact long enough to stick together. Hence, a precrystallizing step after MPP and before SSP can be obviated. Moreover, fluidization of small PET beads assures rapid diffusion of by-products away from the beads to prevent the reverse reaction from occurring. Hence, bottle-grade polyester can be obtained with less reactor residence time. A smaller SSP reactor is then required. These improvements reduce the capital cost and the elevation of the SSP complex.

It is highly desirable to design a simple, inexpensive SSP process for producing PET particles with a sufficiently high intrinsic viscosity in less reaction time.

Therefore, an object of the invention is to provide an SSP reactor and process that can upgrade the intrinsic viscosity of polyester particles from the MPP having an initially low intrinsic viscosity. A further object of the invention is to treat the polyester from an MPP process that has omitted a finishing step. An even further object of the invention is to provide an SSP reactor and process that can provide polyester product with a sufficiently high average intrinsic viscosity over a short reaction period. Lastly, an object of the invention is to provide an SSP reactor and process that uses no crystallizer equipment before the SSP reactor.

SUMMARY OF THE INVENTION

A single-stage fluidized bed reactor or continuously stirred tank reactor exhibits an exponential decay of residence time distribution. This results in wide residence time distribution. When polyester particles are in the SSP reactor for widely varying periods of time, a wide distribution of intrinsic viscosity is obtained. This will require a longer residence time for the polyester product to achieve the same average intrinsic viscosity. We discovered that a multiple stage fluidized SSP reactor would tighten the distribution of residence time and reduce the residence time required to give a desired average intrinsic viscosity. We further discovered that if each stage of the multiple fluidized reactor is not discretely separated, so flow from one stage continuously flows into the other, the reaction proceeds near plug flow conditions. Consequently, less residence time, which is proportional to reactor volume, is needed to achieve a desired average intrinsic viscosity. Hence, the size of the polyester complex can be reduced accordingly. We also discovered that five fluidized stages provides advantageous performance. The process of the present invention utilizes stoops divided by inclined baffles to assure continuous flow and a tight residence time distribution in an embodiment.

Additional objects, embodiments and details of this invention can be obtained from the following description of the invention.

BRIEF DESCRIPTION OF THE DRAWING

The FIGURE illustrates a flow scheme and reactor of the present invention.

DETAILED DESCRIPTION

A detailed description of a preferred method of carrying out the process is given in the context of a continuous solid-state poly-condensation (SSP) process for polyester resin. However, the present invention can be used with other types of polymerization processes, which undergo SSP.

Referring to the FIGURE, the SSP process to which the present invention can be applied uses polymer particles from an MPP process. Suitable particles may be obtained by subjecting molten, low intrinsic viscosity polymer particles from MPP at about 280° to 295° C. to a centrifugal atomizer in a spray congealer as described in U.S. Pat. No. 4,165,420, which is incorporated herein by reference, or by grinding which is far less economical. The spray congealer cools the beads to about 110° C. resulting in beads of about 40 to 45% crystalline and a crystal dimension of about 11 to 13 nm. The resulting polymer beads have an average intrinsic viscosity usually of no more than 0.5 dl/g and between about 0.15 and about 0.35 dl/g in an embodiment. The beads are partially crystallized and have no need to be subjected to any additional crystallization treatment. The beads should have a maximum linear dimension of no more than 1 millimeter on average and in an embodiment between about 100 and about 250 microns on average.

The beads are fed to a hopper 12 through a line 10. The hopper 12 continuously feeds the beads through a line 14, a control valve 16, and a dispenser 18 to a fluidized, multi-stage SSP reactor 20 that can be operated suitably at 150° to 240° C. (302° to 464° F.) and preferably at 210° to 230° C. (410° to 446° F.) for PET. The beads may preheated to reaction temperature by a preheater (not shown) on line 16 or allowed to heat in a reactor 20. The SSP reactor 20 comprises at least one wall, a cylindrical wall 22, in an embodiment, and contains a plurality of baffles 24. An upper baffle 24 is opposed to the dispenser 18. The baffles 24 divide or partition the reactor 20 into a plurality of reactor chambers or stages 26. Openings 28 in the baffles 24 allow fluidizing gas therethrough to fluidize the beads above the baffle. Free edges 32 of baffles have portions spaced apart from all portions of the wall 22, or walls if there is more than one wall, of the reactor 20 to provide for entry from one stage 26 to another. Free edges 32 of adjacent baffles 24 define ports to allow passage of beads from stage 26 to stage. Some beads my fall through openings 28 to skip a stage 26, but most beads will travel through ports 34 defined between free edges of adjacent baffles 24. The gas rate can be set at a sufficiently high rate to prevent the beads from falling through openings 28 and skipping stages. Additionally, the openings 28 can be made sufficiently small to allow passage of gas but prevent passage of beads. Baffles may also include skirts 30 depending from the free edges 32 of baffles 24 in an embodiment to regulate the pressure drop above and below the baffles 24. As such, the ports 34 are defined between the skirt 30 and the free edge 32 of adjacent baffles 24.

In the SSP reactor embodiment shown in the FIGURE each reactor stage 26 is defined by the volume between adjacent baffles, for example, 24a, 24b on the same side of the reactor vessel 20. The opposing baffle 24c horizontally on the other side of the reactor defines an inlet port 34a to each stage 26 between free edge 32a of superjacent baffle 24a and free edge 32c of the opposing baffle 24c. An outlet port 34b from each stage 26 is defined by free edge 32c of the opposing baffle 24c and the free edge 32b of subjacent baffle 24b. The areas of inlet ports 34a, 34b are further constrained if skirts 30 are used. An outlet port 34b for one stage 26 serves as an inlet port 34a for an adjacent stage 26 on the other side of the reactor 20. The embodiment in the FIGURE staggers sequential reactor stages 26 down the length of the reactor 20.

In the embodiment shown in the FIGURE, the baffles 24 are inclined to facilitate continuous, gravity-driven movement of beads from stage to stage. The inclined orientation of each baffle 24 defines a bottom region 25 of each stage 26 at free edge 32. This arrangement assures that polyester beads in the bottom region 25 exit the stage 26 in a continuous fashion and prevents randomness in stage residence time. Adjacent baffles 24 may horizontally overlap. Other types of configurations such as disk and doughnut baffle configurations are also contemplated by the present invention. The fluidized beads move by gravity through the moving bed for about 2 to 5 hours in an embodiment and in an embodiment, no more than 3 hours to yield partially crystalline, opaque beads with an intrinsic viscosity in the high end of the bottle grade range of about 0.70 to about 0.85 dl/g or greater depending upon the application to which the polyester pellets will be put. The beads converge through a dispensing cone 36 and are withdrawn in line 40 from the reactor 20 through an outlet 38 at the bottom of a dispensing cone 38. The outlet 38 is opposed to a lower baffle 24.

A hot, oxygen-free, inert gas, typically nitrogen, is distributed to the SSP reactor 20 to heat the beads to polycondensation temperature and remove by-products given off by the polycondensation reaction. The inert gas is delivered through a line 42 opposed to a lower baffle 24 and is distributed into the SSP reactor 20 by a distributor 44. The inert gas is delivered at about 230° C., in an embodiment. The ratio of the mass flow rate of inert gas should be between 40 to 50% of the mass flow rate of polymer in the reactor 34 if polyester is the product. The superficial velocity of the inert gas may be about 0.5 mls (1.6 ft/s) to assure fluidization. A gas line 46 removes inert gas with gaseous by-products and entrained polymer beads from the reactor 20 to a cyclone separator 50. An inlet 46a to the gas line 46 is opposed to an upper baffle 24. The cyclone separator 50 centrifugally separates solid beads from gaseous by-products and inert gas. The beads are recycled to the reactor 20 through a dipleg 52 and the inert gas containing by-products is carried to treatment through recycle line 54. The inert gas recycled in the recycle line 54 may be at a temperature between 200° and 220° C. (392° and 428° F.).

Fluidizing the polymer beads over sequential stages 26 normalizes the residence time of the beads into a tighter distribution. Consequently, the distribution of intrinsic viscosity is tighter. The residence time, which is a factor of reactor volume, corresponds more closely to the target average intrinsic viscosity without having to account for exponential decay of the residence time distribution calculated for a single reactor stage.

Greater intrinsic viscosity lift is obtained by conditions of higher reaction temperatures, longer reaction times and higher intrinsic viscosity of the feed polymer. The present invention provides for sufficient lift in intrinsic viscosity to achieve bottle-grade status at lower values for the above reaction parameters. Using smaller polyester particle size allows the polycondensation reaction to proceed more rapidly. By using multiple reactor stages to narrow the residence time distribution, a shorter overall residence time is necessary to achieve the necessary average intrinsic viscosity. Reaction times can range between about 2 and about 5 hours. Continuously passing beads from stage to stage 26 under fluidization allows the polycondensation reaction to proceed near plug flow conditions. The reaction temperature should be between about 210° and about 230° C. However, because the beads are fluidized, the reaction temperature can be operated more toward the higher end of the range without sticking causing a problem. Moreover, because stickiness is less likely to affect operation, precrystallizers prior to the SSP reactor are obviated.

The SSP reactor 20 of the present invention should have between 2 and about 30 reactor stages 26. We have determined that most of the benefit in terms of increasing average intrinsic viscosity is gained by employing five reactor stages. However, intrinsic viscosity increases level out at about 20 stages.

The purging inert gas is recycled as follows. The recycle line 54 runs the inert gas with impurities through a dedusting cyclone 56 from which dust is discarded in line 57 and a dedusting filter 58. The dedusted and filtered recycled inert gaseous stream is pumped by a blower 60 through a heat exchanger 62 and is mixed with air injected by a line 64. The air/inert gaseous mixture is carried by a line 66 through a heater 68, if necessary to achieve the desired oxidation reaction temperature, into an oxidation reactor 70, where the organic by-products are combusted by circulating the inert stream over an oxidation catalyst bed. A line 72 withdraws the effluent from the oxidation reactor 70 that contains only nitrogen, carbon dioxide, water and traces of oxygen. The carbon dioxide content stabilizes at a certain level due to the losses through the SSP plant and acts like an inert gas. The exiting gaseous stream in the line 72 is indirectly heat exchanged in the heat exchanger 62 with dedusted and filtered recycled inert gaseous stream from the line 54. The gaseous stream in the line 72 may be further cooled in a heat exchanger 74 to condense and dispose of part of the water by cooling the oxidation reactor effluent by about 10° to 15° C. The gaseous stream is delivered to a dryer 76 typically operating at 30° C.(86° F.). The dryer 76 typically contains molecular sieves for adsorbing the water. The effluent of the dryer 76 is transported through line 78 by blower 80 to a heat exchanger 82 after having been filtered (not shown) of possible particles deriving from the molecular sieves. The heat exchanger 82 heats the gaseous stream to a temperature of about 230° C. and recycles the gaseous stream to the reactor 34 through the line 42. The regeneration of the molecular sieves bed is performed according to known methods, operating for example on a closed circuit with a hot nitrogen stream (not shown). Optionally parallel beds may be employed, one being active while the other is regenerated.

EXAMPLES

We simulated an SSP reaction process using a multistage fluidized reactor of the present invention. The initial intrinsic viscosity of the polyester beads simulated was 0.30 dl/g and had an average maximum linear dimension of 100 to 200 μm. The SSP reactor was simulated with five stages and at 230° C. The SSP process simulated took 1.7 hours to produce a polyester product with an average intrinsic viscosity of 0.85 dl/g.

We also simulated an SSP reaction process using the same conditions as above but with a reaction temperature of 220° C. The SSP process simulated took about 3.5 hours to produce a polyester product with an average intrinsic viscosity of 0.85 dl/g.

We also simulated an SSP reaction process using the same conditions as above but with an initial intrinsic viscosity of 0.26 dl/g and a reaction temperature of 220° C. The SSP process simulated took 4.8 hours to produce a polyester product with an average intrinsic viscosity of about 0.78 dl/g.

What is claimed is:

1. A multistage fluidized solid-state poly-condensation reactor comprising:

a reactor vessel including at least one wall and said reactor vessel being partitioned into more than one chamber by at least one inclined baffle, said inclined baffle having a free edge that is spaced apart from all of said at least one wall;

a polymer particle inlet in said reactor vessel;

a purge gas outlet in said reactor vessel, said particle inlet and said purge gas outlet being opposed to one of said at least one baffle;

a polymer particle outlet in said reactor vessel; and a purge gas inlet in said reactor vessel, said purge gas inlet and said particle outlet being opposed to one of said at least one baffle.

2. The reactor of claim 1 wherein said at least one wall is a cylindrical wall.

3. The reactor of claim 1 wherein said at least one baffle has openings therein to allow for fluidization.

4. The reactor of claim 1 wherein said at least one baffle horizontally opposes another baffle on the other side of the reactor to define an inlet port between free edges of the opposing baffles.

5. The reactor of claim 1 wherein the polymer particle outlet communicates with said reactor through a cone.

6. The reactor of claim 1 including at least five chambers.

7. A continuous process for increasing the intrinsic viscosity of polymer particles, said process comprising:

continuously feeding polymer particles to a solid-state polycondensation reactor, said reactor including at least a first stage and a second stage;

fluidizing said polymer particles in said first stage with an inert gas at SSP reaction conditions;

continuously passing said polymer particles from a bottom region of said first stage to said second stage;

fluidizing said polymer particles in said second stage with an inert gas at SSP reaction conditions;

recovering polymer particles from the reactor having an intrinsic viscosity that is higher than the intrinsic viscosity of the polymer particles fed to the reactor; and recovering an inert gas from said reactor.

8. The process of claim 7 wherein said polymer particles fed to the reactor have an average largest dimension of no more than 1 millimeter.

9. The process of claim 7 wherein said polymer particles fed to the reactor have an average intrinsic viscosity of no more than 0.5 dl/g.

10. The process of claim 7 wherein said polymer particles are fed to the reactor without going through a precrystallizing step.

11. The process of claim 7 wherein said polymer particles recovered from the reactor have an average intrinsic viscosity of no less than 0.7 dl/g.

12. The process of claim 7 wherein the average residence time polymer particles recovered from the reactor is no more than about 5 hours.

13. The process of claim 7 including passing the polymer particles to at least five fluidized stages in said reactor.

14. A continuous solid-state poly-condensation process comprising:

continuously feeding polymer particles having an average intrinsic viscosity of no more than 0.5 dl/g to a solid-state polycondensation process;

fluidizing said polymer particles in said first stage with an inert gas at SSP reaction conditions;

continuously passing said polymer particles from said first stage to said second stage;

fluidizing said polymer particles in said second stage with an inert gas at SSP reaction conditions;

recovering polymer particles from the process having an intrinsic viscosity that is higher than the intrinsic viscosity of the polymer particles fed to the process; and recovering an inert gas from said process.

15. The process of claim 14 wherein said polymer particles fed to the process have an average intrinsic viscosity of no more than 0.3 dl/g.

16. The process of claim 14 wherein said polymer particles fed to the process are partially precrystallized.

17. The process of claim 14 wherein said polymer particles recovered from the process have an average intrinsic viscosity of no less than 0.7 dl/g.

18. The process of claim 14 wherein the average residence time of polymer particles recovered from the process is no more than about 3.5 hours.

19. The process of claim 14 wherein the average residence time of polymer particles recovered from the process is no more than about 2 hours.

20. The process of claim 14 including passing the polymer particles to at least five fluidized stages in said process.

* * * * *